Apr. 3, 1923.

N. C. WELLS ET AL

BUTT GAGE

Filed Mar. 24, 1921

1,450,676

INVENTORS
NEWTON C. WELLS
HUBERT J. MEYER
BY
*Hazard & Miller*
ATTORNEYS.

Patented Apr. 3, 1923.

1,450,676

UNITED STATES PATENT OFFICE.

NEWTON C. WELLS AND HUBERT J. MEYER, OF LOS ANGELES, CALIFORNIA; SAID MEYER ASSIGNOR TO SAID WELLS.

BUTT GAUGE.

Application filed March 24, 1921. Serial No. 455,128.

*To all whom it may concern:*

Be it known that we, NEWTON C. WELLS and HUBERT J. MEYER, citizens of the United States, residing at Los Angeles, in the county of Los Angeles and State of California, have invented new and useful Improvements in Butt Gauges, of which the following is a specification.

It is the object of this invention to provide a gauge particularly adapted to mark the outline of the space which is arranged to receive a hinge. The gauge is adjustable so as to be employed in connection with various sizes of hinges and is so constructed that a tap of a hammer against the same will distinctly mark the outline of the recess to be cut. The gauge structure also includes a scriber so positioned that it may be readily employed for marking the depth of the recess to be cut, and said scriber is preferably adjustable with relation to the gauge structure in order that recesses of various depths and adapted to receive hinges of various sizes may be readily marked.

The invention will be readily understood from the following description of the accompanying drawings, in which—

Figure 1:
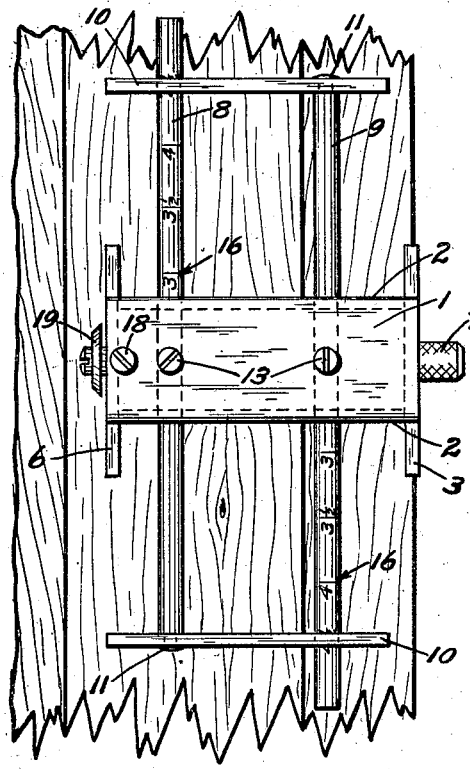
Figure 1 is a plan view of the gauge in operative position for marking the width and length of a recess to be cut.
Figure 3:
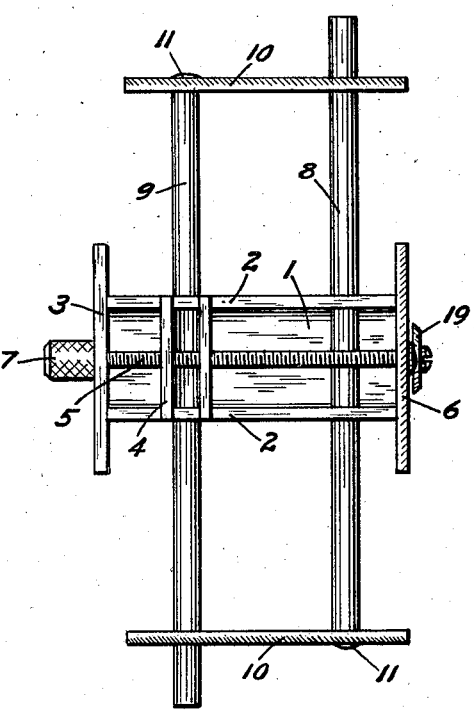
Fig. 3 is a plan view showing the opposite side of the gauge.

The gauge includes a base member having a surface 1 provided with depending side walls 2 and having an end wall 3 extending across one end of the base and also depending from surface 1.

An abutment element is mounted within the base member transversely thereof and includes a channel iron 4 extending across the base beneath surface 1 and between side walls 2. A rod 5 is threaded through the channel iron and is journaled at one end in end wall 3, and at its opposite end in a gauge plate 6 which extends across the opposite end of the base and depends from surface 1. The rod 5 is also journaled in this gauge plate, and it will thus be seen that by rotating the threaded rod, the abutment element 4 will be moved back and forth along the base member. In order to turn the threaded rod, a knurled head 7 may be provided upon the end of the same projecting through end wall 3.

Rods 8 and 9 extend transversely of the base member and are slidably received through side walls 2. Gauge plates 10 are mounted upon these rods, and the respective gauge plates are detachably connected as shown at 11 to opposite ends of the respective rods 8 and 9.

By the construction as thus described, it will be seen that gauge plates 10 may be moved toward and away from one another transversely of the base member by sliding rods 8 and 9 through the base member, and these gauge plates are preferably held in adjusted positions by means of set screws 13 received through surface 1 of the base member and engaging the respective rods 8 and 9. The edges of gauge plates 10 and of gauge plate 6 are arranged as beveled cutting edges 14 so that when the gauge is placed against a door frame, or the like, a slight tap of a hammer against the gauge will cause the cutting edges of the gauge plates to mark the outline of a hinge recess.

In operation the abutment element 4 is adjusted with relation to gauge plate 6 in accordance with the width of the hinge recess, and gauge plates 10 are adjusted with relation to one another in accordance with the length of the hinge recess, and the hinge gauge is then positioned against the door frame so as to overlie the same with abutment element 4 abutting against the edge of the frame. Thus it will be seen that by reference to Fig. 1 the gauge plate 6 and the gauge plates 10 will accurately mark the width and the length of the hinge recess respectively. In practice suitable graduations 16 may be provided along the rods 8 and 9 in order to adjust the gauge for hinges of any desired length.

Figure 2:
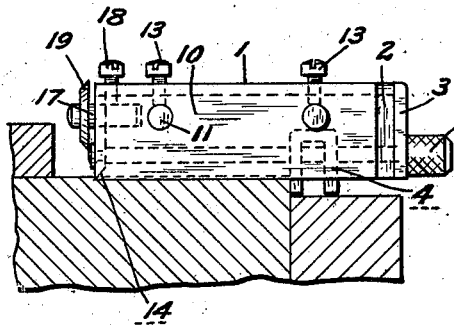
Fig. 2 is an end view of the gauge in such position.
Figure 4:
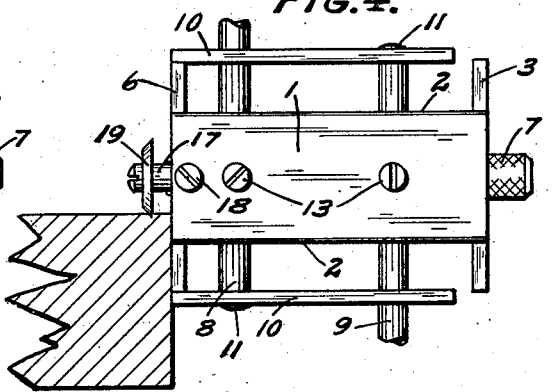
Fig. 4 is a plan view showing the method of using the gauge for marking the depth of the recess to be cut.

The improved gauge preferably also provides means for marking the depth of a hinge recess, and for this purpose a rod 17, Fig. 2, is slidably received through gauge plate 6 and is held in adjusted positions with relation to the base of the gauge by means of a set screw 18 received through surface 1 of the base member. A scriber shown as a rotary scriber 19 is journaled upon rod 17 so that it will be adjustably spaced with relation to gauge plate 6 as rod 17 is moved into adjusted positions.

In order to mark the depth of a hinge opening the rotary scriber 19 is adjusted with relation to the surface of gauge plate 6 a distance equal to the required depth for the hinge recess, and the gauge plate 6 is then positioned against the surface of the door frame in which the recess is to be formed so that the rotary scriber engages the edge of said frame, and by then moving the gauge back and forth, the edge of the frame may be marked at the predetermined depth.

The construction, as thus described, provides simple and efficient means for not only readily marking the length and width of a hinge recess, but also affords means whereby the depth of the hinge recess may be accurately marked by the same tool. It will be noted that the gauge provides for adjustment of the same not only for lengths and widths of hinge recesses, but also for various depths of the same.

Various changes may be made without departing from the spirit of the invention as claimed.

What is claimed is:

1. A gauge comprising a base, a transverse gauge plate carried thereby, rods slidable transversely through said base, gauge plates upon said rods at the respective sides of said base and secured respectively to opposite ends of the respective rods, means for securing said rods in adjusted positions relative to said base, a screw rod extending longitudinally of said base, and a transverse abutment element threaded thereon for adjustment lengthwise of said base and relative to said transverse gauge plate.

2. A gauge comprising a base, a transverse gauge plate carried thereby, rods slidable transversely through said base, gauge plates upon said rods at the respective sides of said base and secured respectively to opposite ends of the respective rods, means for securing said rods in adjusted positions relative to said base, a screw rod extending longitudinally of said base, a transverse abutment element threaded thereon for adjustment lengthwise of said base and relative to said transverse gauge plate, and a scriber spaced from said transverse gauge plate and having means for adjusting the same relative to said gauge plate.

3. A gauge comprising a base, a transverse gauge plate carried thereby, rods slidable transversely through said base, gauge plates upon said rods at the respective sides of the base, each plate being secured to one rod and slidable on another rod, the different plates being secured to different rods respectively, and means for securing said rods in adjusted positions relative to said base.

4. A gauge comprising a base, members slidably associated with the base, gauge plates on the members, each plate being secured to one member and slidable on another member, the different plates being secured to different members respectively, and means for securing said members in adjusted positions relative to each other.

In testimony whereof we have signed our names to this specification.

NEWTON C. WELLS.
HUBERT J. MEYER.